Jan. 9, 1962 P. M. GRANT ET AL 3,016,507

THIN FILM MAGNETO RESISTANCE DEVICE

Filed Sept. 14, 1959

INVENTORS
PAUL M. GRANT
ROBERT VINCENT PENNEY

BY Frederick D. Poag
ATTORNEY

United States Patent Office 3,016,507

Patented Jan. 9, 1962

3,016,507
THIN FILM MAGNETO RESISTANCE DEVICE

Paul M. Grant, Poughkeepsie, and Robert Vincent Penney, Newburgh, N.Y., assignors to International Business Machines Corporation, New York, N.Y., a corporation of New York Filed Sept. 14, 1959, Ser. No. 839,864
2 Claims. (Cl. 338—32)

This invention relates to electrical signal control circuit devices and more particularly to a magneto resistance active device having a thin film structure.

The phenomenon of change of resistance in a conductor carrying a current at right angles to a magnetic field has been long known, and it is also well known that this effect is especially pronounced in the case of certain semi-conductors, particularly indium antimonide. It has, accordingly, been suggested that this principle be employed to provide an amplifier device wherein the output current through a magneto resistive element is a function of a magnetic field which varies in accordance with an input signal. Little employment of such devices has been made, however, since the proposed devices have had little advantage over other amplifier structures and, on the contrary, have had numerous disadvantages, such as low gain and low high frequency cut-off.

In accordance with the present invention, a magneto resistance "active" device, that is, one capable of a power gain and therefore employable as an amplifier or the like, is provided wherein the various elements are in the form of thin films, that is, the preferred thicknesses of elements range from less than 10,000 Angstroms in certain insulator and gap forming parts to the order of 100,000 Angstroms in certain core parts, as will appear more fully hereinafter. It has been determined that when this is done many of the prior art objections to magneto resistance type amplifiers are overcome, and a practical, sub-miniature device is provided which has advantages of stability and simplicity as compared to other available amplifier devices. That is, while it may be regarded as self-evident that the employment of thin film manufacturing techniques will result in miniaturization of the device, there are attendant advantages which also increase the acceptability of the response of the apparatus.

While the device as a whole is preferably quite small, it should be noted that by far the largest dimension reduction is in thickness. Thus, the thin film structure enables very close linkage of the ferro-magnetic core of the device by the flux of the magnetizing lines. Secondly, and very importantly, the deposited character of the thin film device yields a gap in the ferromagnetic core, in which the magneto resistance element is placed, of very small thickness. The minimization of the gap thickness provides a magnetic circuit of minimum reluctance with the result that the flux through the magneto resistive element is maximized for a given input requirement. It has been determined that this results in a substantial gain, whereby amplifier devices in accordance with the invention can be operated in cascade relation.

Furthermore, the general miniaturization and particularly the thinness of the core element and gap portions of the device reduce the volumes of these parts to very small quantities. It can be shown that the high frequency cut-off of the device is a function of the volume of the non-ferromagnetic gap in the magnetic circuit and also of the volume of the ferromagnetic core material. Thus the reduction of the gap volume and of the core volume has the effect of raising the cut-off from the very low value associated with ordinary size prior art devices, to entirely acceptable values.

Accordingly, a major object of the invention is to provide an improved magneto resistance circuit device.

Another object of the invention is to provide an improved device as aforesaid having a ferro-magnetic core which is linked very closely by the input current lines.

Still another object of the invention is to provide an improved device as aforesaid having a ferro-magnetic flux path providing element which has low total volume, and which is characterized by a gap in which the magneto resistive element is located which has minimum length in the direction of the flux lines as well as minimum volume, with resultant increases in the magnetic efficiency of the device for maximizing both gain and frequency response.

Other objects of the invention will be apparent from the foregoing, from the following detailed description of a preferred embodiment of the invention, from the appended claims, and from the drawings wherein:

Figure 5A:
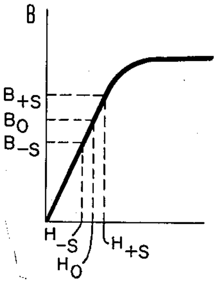
Figure 5B:
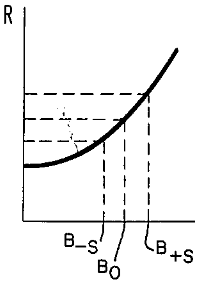

FIG. 5*a* is a showing of a magnetization curve of high permeability ferro-magnetic material suitable for the core of the device, indicating the highly magnetized but linear region preferred for operation of the device; and FIG. 5*b* is a representation of a typical resistance versus flux curve of the apparatus of the previous figures showing a preferred bias point and a preferred operating swing on the curve for the maintenance of approximate linearity and high gain in operation of the device.

Figures 1, 2, 3:
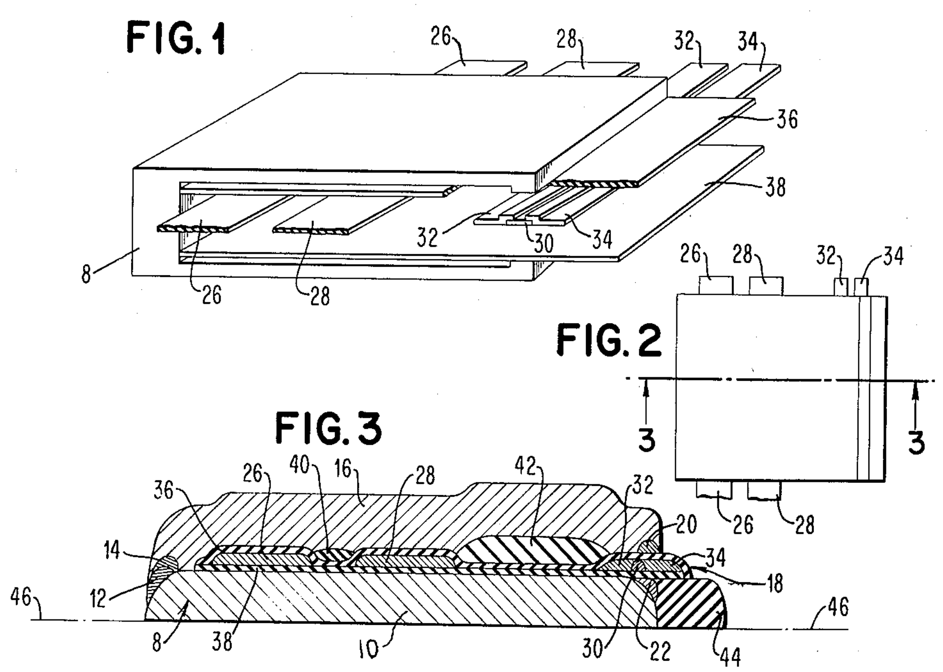
FIG. 1 is a schematic, vertically expanded and partly broken away perspective view of a magneto resistance device in accordance with the invention, elements of the structure being simplified as to shape and sub-assembly structure, for clarity of representation of the relative positions of the several parts.
FIG. 2 is a plan view of the device illustrated schematically in FIG. 1, but representative of the actual structure of the device.
FIG. 3 is a sectional view taken about along line 3—3 of FIG. 2.

In FIGS. 1 and 3, the vertical scale is greatly enlarged, and the vertical proportions are only roughly indicative of the relative thickness of parts. In the structure most accurately represented in FIG. 3 to which the table of dimensions hereinafter applies, the over-all structure is only about 216,000 A. thick, but 1 cm. square, and the thickness of various parts differ by ratios of up to 100:1.

Referring now more particularly to FIGS. 1, 2, and 3, of the drawing, a preferred embodiment of the magneto resistance device of the invention is shown to comprise a core generally indicated at 8 having first leg layer 10 of nickel iron or other high permeability magnetic material, spacer layers 12, 14 of like material, and a second leg layer 16 of the same material companion to the first layer 10, so as to form a magnetic core arrangement having a non-ferromagnetic gap 18. For providing ample magnetic material at the gap forming pole faces of the core, it is preferred that additional deposits 20, 22 of the ferro-magnetic material be provided, particularly where evaporation deposit techniques are employed.

Embraced within the generally C-shaped core 8 thus presented are flux inducing means for setting up a magnetic field in the core and across the gap 18 having a desired quiescent value and for superimposing thereon a flux signal component to provide a net variation in the flux in accordance with an input signal. In the illustrated embodiment of the invention, a pair of copper or other highly conductive material lines 26, 28 are provided for this purpose, in embraced, flux linking relation to the aforedescribed core 8.

Disposed within the gap 18 is a layer 30 of magneto resistive material comprising the flux sensing element of the device; since the magneto resistance effect is known to be a function of electron and hole mobility, a semi-conductor material is used for this element, the most preferred known material being indium antimonide. Extending lengthwise along the long sides of the layer or element 30 are lead layers 32, 34 of copper or the like, in substantially continuously contacting relation to those long sides of the element 30 so as to provide contact thereto for establishing a current path therethrough at right angles to the flux across the gap 18 and across the short plan dimension of the relatively long layer 30 of magneto resistive material, as shown. For providing a good and continuous contact between the contact members 32, 34 and the corresponding sides of the element 30, the elements may be lapped as shown. Where evaporation techniques are used for depositing these layers, this orientation of them provides a tolerance for insuring good contact and, also, provides a means for yielding a relatively narrow effective width of the magneto resistive element 30 where the designed width of the same is so narrow that the deposition of the element 30 to that actual width would be unduly difficult. Although this lapping would seem to be undesirable, considering the wanted minimization of the gap thickness, in actual practice the lapped edges are somewhat beveled as shown in FIG. 3, due to the fringing effects which occur when the preferred, vacuum method of depositing the parts is employed, and thus the over-all thickness of the lapped portions may be held within acceptable limits. As shown in FIG. 3, ideally the beveling compensates for the lapping in such manner that the over-all thickness of these lapped portions 30, 32, 34 in the direction of the flux does not exceed the thickness of the magneto resistive element 30 itself in that direction.

The several electric circuit elements 26, 28, 30, 32, 34 are supported with respect to the core 8 and insulated therefrom by deposits of a suitable insulator material such as silicon monoxide. For clarity of illustration, the insulator material is indicated in FIG. 1 as two simple sheets 36, 38 for emphasis of the electrical insulation function of this material in separating the circuit elements from the iron. It will be understood that the insulator material actually fills the volume indicated in FIG. 3 so as to perform the further function of giving mechanical support to the several elements embedded therein as well as to support and shape the core legs 10, 16; accordingly, in actual practice the insulator material is laid down in a number of layers including additions 40, 42 to one of the main layers 36, so as to establish the resultant shape shown in that figure. Also, the structure desirably includes an insulator material support layer 44 for the contact element 34, with the entire assembly being built up on a quartz glass or other suitable material substrate indicated at 46.

It will be observed that the structure as thus far described is well suited to formation by vacuum, evaporation deposition or what might be called coating or plating techniques whereby extremely thin layers may be formed. It is a major feature of the present invention that the magneto resistance device is of this character, thereby yielding a composite unit wherein, as aforesaid, the iron volume is extremely small as compared to ordinary core elements, the gap 18 is extremely short in the direction of the flux path and also very low in volume, and the energizing lines 26, 28 are situated at a very small average distance from the iron core body, with resultant high gain and broad frequency response characteristics. In other words, the device is a so-called "thin film" device and its practical operability or utility stems very largely from this fact.

While vacuum deposition is the preferred method of manufacture, it is the thin and closely adherent character of the parts which is of importance, and therefore the various thin films forming the device are referred to herein and in the appended claims as "platings" or "coatings" by which their thin, deposited character is defined, irrespective of the method of deposition actually employed. As an example of the dimensions of a practical embodiment of the invention, the following values may be taken as illustrative, the heights, widths, and depths being as the parts are seen in FIG. 3.

| Part | Height (Angstroms) | Width (Inches) | Depth (Inches) | Material |
|---|---|---|---|---|
| 10 | 100,000 | 0.4 | 0.4 | NiFe |
| 12 | 10,000 | 0.005 | 0.4 | NiFe |
| 14 | 10,000 | 0.005 | 0.4 | NiFe |
| 16 | 100,000 | 0.4 | 0.4 | NiFe |
| 20 | 20,000 | 0.005 | 0.4 | NiFe |
| 22 | 20,000 | 0.005 | 0.4 | NiFe |
| 26 | 7,000 | 0.08 | [1] 0.4 | Cu |
| 28 | 7,000 | 0.08 | [1] 0.4 | Cu |
| 30 | 7,000 | [2] 0.005 | 0.4 | InSb |
| 32 | 7,000 | 0.03 | [1] 0.4 | Cu |
| 34 | 7,000 | 0.03 | [1] 0.4 | Cu |
| 36 | 1,000 | 0.38 | 0.4 | SiO |
| 38 | 1,000 | 0.38 | 0.4 | SiO |
| 40 | 7,000 | 0.035 | 0.4 | SiO |
| 42 | 14,000 | 0.12 | 0.4 | SiO |
| 44 | 100,000 | 0.04 | 0.4 | SiO |

[1] Plus external lead length.
[2] Due to lapping between the members 30, 32, 34 the actual effective spacing between the elements 32 and 34 is approximately 0.004 inch.

The device shown in FIGS. 1–3 may be used in many circuit applications, similarly to a vacuum tube or a transistor, wherein a so-called "active" circuit control element is needed, that is, one which controls a suitable signal in response to an input signal and is capable of power gain.

Figure 4:
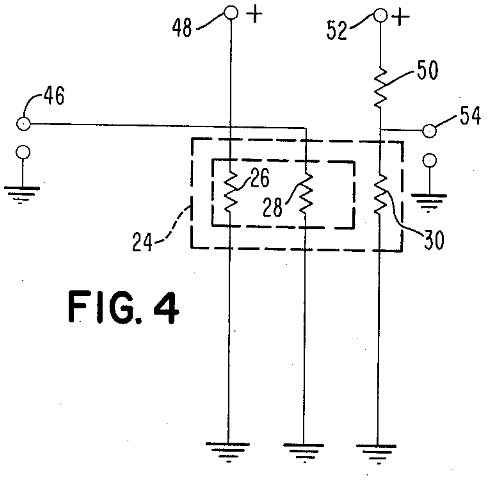
FIG. 4 is a schematic circuit diagram of a magneto resistance amplifier in accordance with the invention, employing the electro-magnetic and magneto resistance structure of FIGS. 1 and 2.

For example, the device may be employed as a constituent part of a class A amplifier arrangement, as shown in FIG. 4. In this electrical schematic figure, the core element 8 is shown as a dotted rectangle, and the energizing lines 26, 28 and the magneto resistive element 30 are shown as resistors. Because the current flow paths through the contacts 32, 34 of the indium antimonide element are effectively transverse to those returns, the resistance of these parts may be considered small and may be ignored; in any case, this resistance is low compared to the load resistance. Preferably the energizing line 28 nearest the gap 18 is employed as the line connected to the input terminal 46 as shown and the more remote energizing line 26 is utilized as the bias line which may be energized at a suitable terminal 48. A load resistor 50, a terminal 52 for connection thereof to a power supply, and an output terminal 54 connected between the load resistor and magneto resistive element 30 complete a suitable circuit arrangement for amplifier use. Referring to FIG. 5*a*, it is preferred, for class A operation, that the device be biased for operation well up on the magnetization curve of the core material, such as at the point indicated by the reference line $H_0$, but within the linear region of the magnetization line so that a magnetization can swing throughout the range indicated by the reference lines $H_{-s}$ and $H_{+s}$ while providing a linear change in flux density.

Referring now to FIG. 5*b*, a typical change in resistance curve with change in magnetic flux density is shown for indium antimonide. It will be observed that this is a parabolic curve so that maintenance of a substantial flux density is desirable both for operation on a relatively steep part of the curve and for maintenance of preferred linearity for class A operation. Accordingly, a relatively high permeability of material is desired for the core, such as the nickel iron specified in the above table, for provision of, in combination with the geometry of the device, the desired flux concentration.

Utilizing the circuitry of FIG. 4, with a load resistor of 1K ohm, and the dimensions given in the foregoing table which yield resistances of approximately 2.75 ohms in each of the energizing lines 26, 28 and 1.75 ohms in the indium antimonide, and employing a nickel iron with a permeability of 100 at a bias field of only 1 kilogauss and a load current of 100 milliamperes, the power gain of the device has been determined to be in excess of 20 db at a voltage gain of 2.5.

It will be understood that while the terminal 46 is designated the signal input terminal and terminal 48 the bias terminal, the input to terminal 46 may, if desired, be a mixed A.C. and D.C. quantity and therefore have a bias component, and that the two magnetizing conductors 26, 28 may be merged where desired. Thus the elements 26, 28 constitute magnetization control means which may comprise one or more conductors which may be employed to be effective in many inter-modifying manners according to circuit requirements, similarly to the elements of a multi-electrode vacuum tube.

It will be observed that the embodiment of the invention as particularly illustrated and described has been designed for a large power gain somewhat at the expense of voltage gain. By this means the device is capable of driving the signal inputs of like stages. It has been found that this can be done in the thin film device since, because of its thin character, the resistance of the indium antimonide element is fairly high and the magnetic efficiency, due to the small gap, is also high so as to yield fairly high voltage gain due to the high flux concentration across the gap. It will be appreciated that in other applications, where low impedance output capability is not a requirement, the effective width of the magneto resistive element 30 transverse to the flux path can be increased. In any event it should be noted that the thin film character of the magneto resistance element 30 raises its resistance to such proportions that a preferred geometry for such an element, that is contact along the long sides of an elongate element with the current transverse of that elongate element, can be utilized readily. This capability flows from the thin film character of the device, since indium antimonide has such a low specific resistance that in samples of the material formed by ordinary mechanical methods, the conductivity would be found to be unmanageably high.

While only one embodiment of the invention has been illustrated and described in detail, it will be appreciated that the invention is not limited thereto, but may be embodied otherwise within the spirit of the invention and the scope of the appended claims.

What is claimed is:

1. A magneto resistance active device comprising a first layer of ferro-magnetic material in the form of a thin plating, first insulation means in thin coating form superposed in deposited contact on said first layer, magnetizing current conductor means in thin plating form superposed in deposited contact on said first insulation means, output current carrying means in thin deposited film form superposed in deposited contact on said first insulation means and comprising magneto resistive semi-conductor means, second insulation means in thin coating form superposed in deposited contact on said magnetizing current conductor means and on said current carrying means, and a second layer of ferro-magnetic material in the form of a thin plating superposed in deposited contact on said second insulation means, said first and second layers being oriented to embrace said conductor means to be magnetized by the field of current through said conductor means and to form magnetic poles embracing said semi-conductor means, and the thicknesses of said layers, said insulation means, said current conductor means, and said current carrying means being in the order of 100,000 Angstroms, 1,000 Angstroms, 7,000 Angstroms, and 7,000 Angstroms, respectively.

2. A magneto resistance active device comprising a first layer of ferro-magnetic material in the form of a thin plating, first insulation means in thin coating form superposed in deposited contact on said first layer, magnetizing current conductor means in thin plating form superposed in deposited contact on said first insulation means, output current carrying means in thin deposited film form superposed in deposited contact on said first insulation means and comprising indium antimonide magneto resistive semi-conductor means, second insulation means in thin coating form superposed in deposited contact on said magnetizing current conductor means and on said current carrying means, and a second layer of ferro-magnetic material in the form of a thin plating superposed in deposited contact on said second insulation means, said first and second layers being oriented to embrace said conductor means to be magnetized by the field of current through said conductor means and to form magnetic poles embracing said semi-conductor means.

References Cited in the file of this patent

UNITED STATES PATENTS

| | | |
|---|---|---|
| 2,707,223 | Hollmann | Apr. 26, 1955 |
| 2,752,434 | Dunlap | June 26, 1956 |
| 2,793,275 | Breckenridge et al. | May 21, 1957 |
| 2,938,160 | Steele | May 24, 1960 |